UNITED STATES PATENT OFFICE.

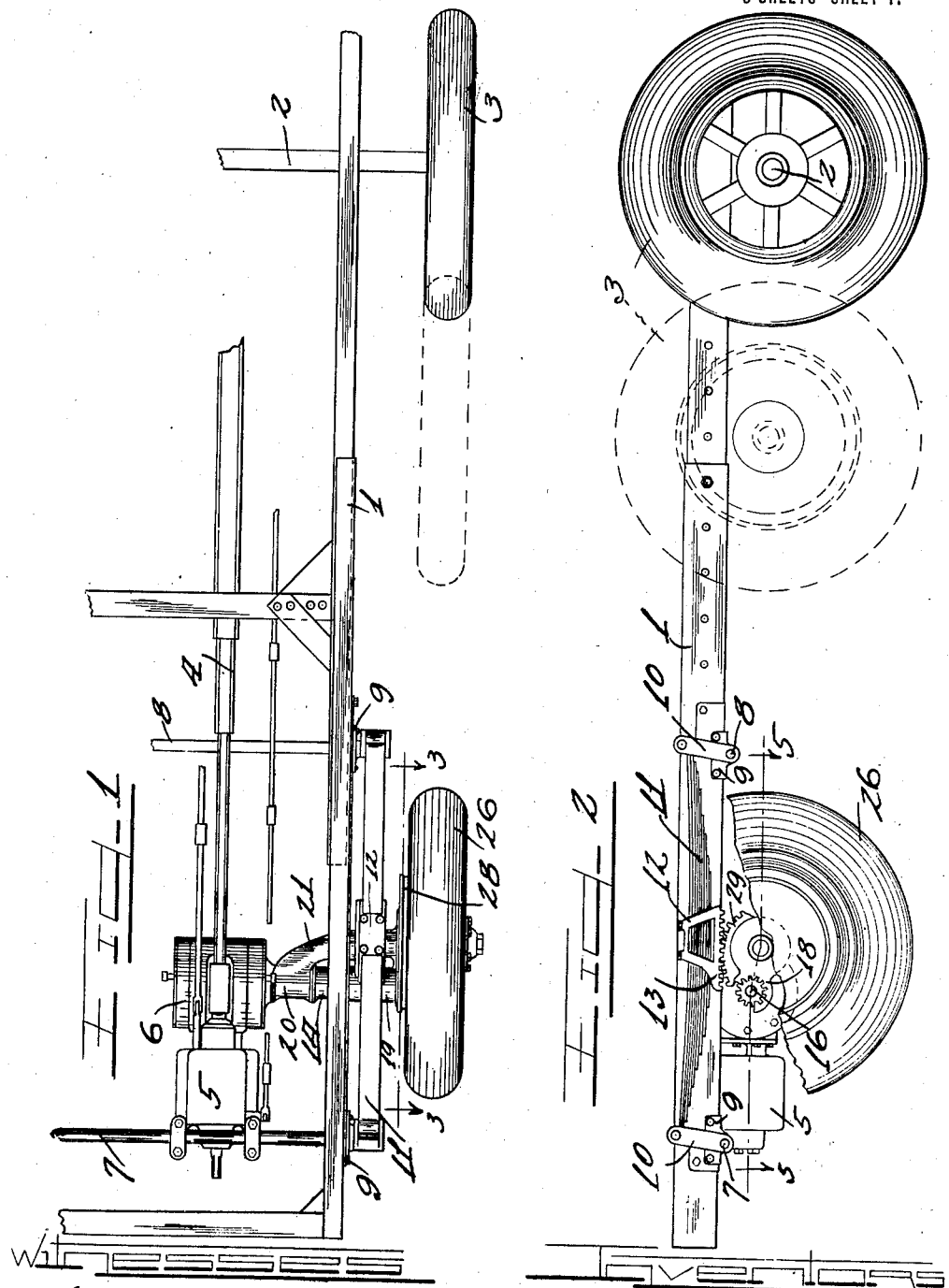

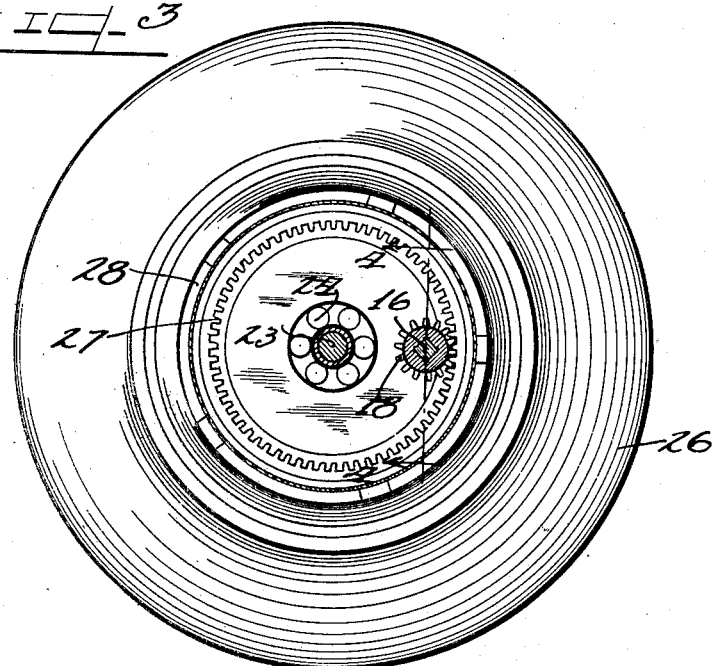
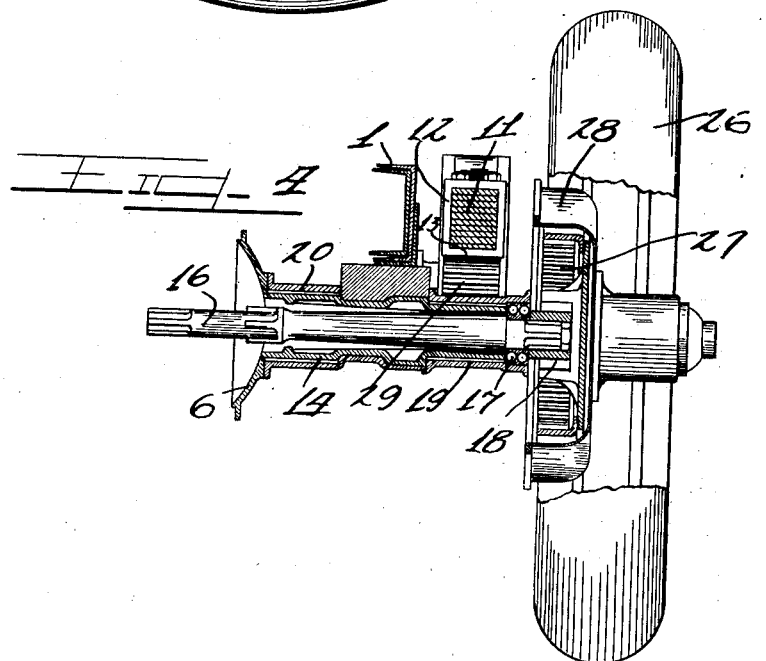

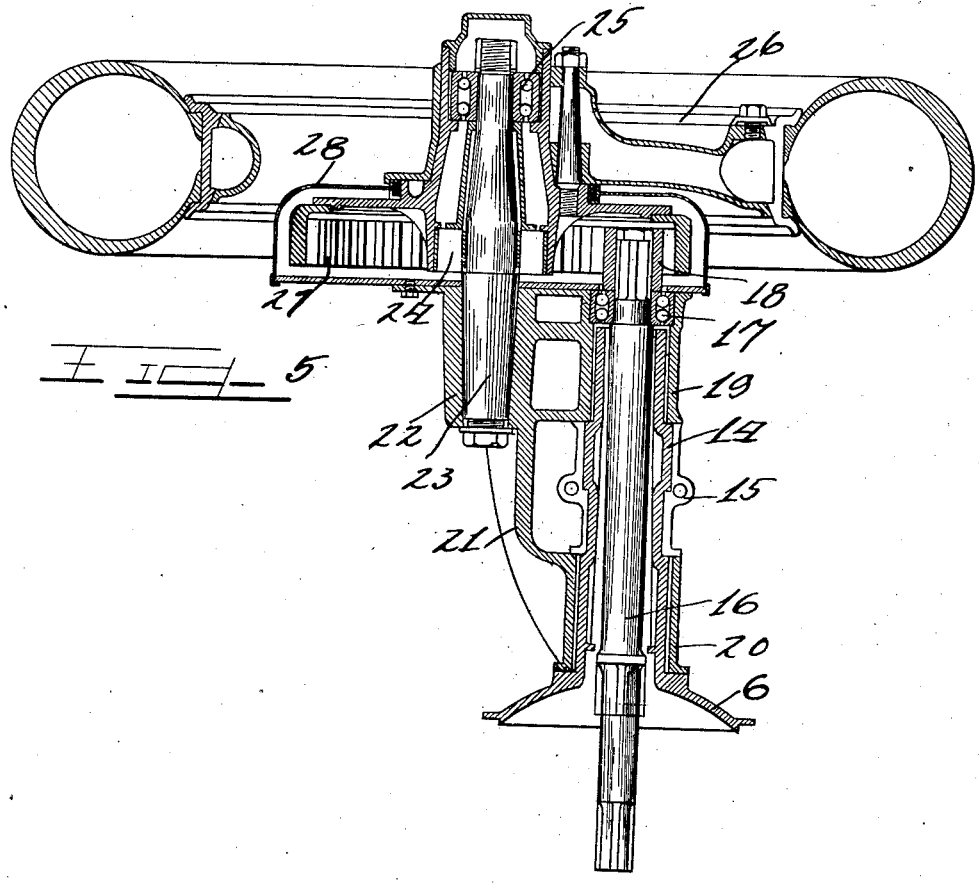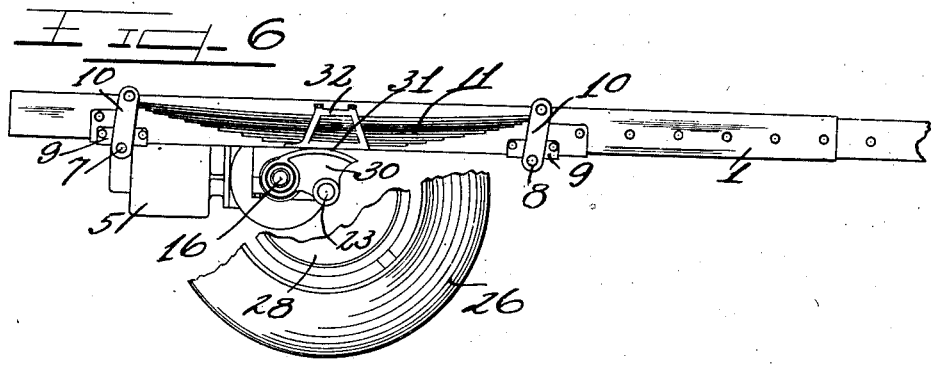

ALBERT EUGENE COOK, OF EVANSTON, AND THOMAS VAN TUYL, OF KANKAKEE, ILLINOIS; SAID VAN TUYL ASSIGNOR TO SAID COOK.

OSCILLATING AXLE MECHANISM.

1,417,800.   Specification of Letters Patent.   Patented May 30, 1922.

Application filed May 14, 1920. Serial No. 381,345.

*To all whom it may concern:*

Be it known that we, ALBERT E. COOK and THOMAS VAN TUYL, citizens of the United States, and residents of the city of Evanston, in the county of Cook and State of Illinois, and the city of Kankakee, in the county of Kankakee and State of Illinois, respectively, have invented certain new and useful Improvements in an Oscillating Axle Mechanism; and we do hereby declare that the following is a full, clear, and exact description of the same, reference being had to the accompanying drawings, and to the numerals of reference marked thereon, which form a part of this specification.

This invention pertains to an improved type of a vehicle chassis having a straight line drive connected with a transmission and differential which are securely mounted on the chassis frame and are adapted to transmit a drive to the chassis driving wheels which are mounted to oscillate about the chassis rear axle housing and receive a drive from the rear axle.

It is an object of this invention to provide an automobile chassis with oscillating axles adapted to removably receive the chassis driving wheels which are connected to receive a drive from the chassis rear axle.

It is also an object of this invention to provide a vehicle chassis wherein the rear driving wheels are spring suspended and adapted to oscillate with respect to the chassis driving axle.

It is a further object of the invention to provide an oscillating axle upon which a driving wheel is adapted to be removably mounted to receive a drive from a driving axle about which the wheel supporting axle oscillates.

Another object of the invention is to construct a chassis driving mechanism wherein a rear axle housing has a bracket pivotally mounted thereon for supporting a stud shaft on which a driving wheel is removably mounted in position to be driven through speed reducing gears from the rear driving axle in said rear axle housing.

It is furthermore an object of the invention to provide a shock absorbing spring mechanism for a wheel supporting axle which is mounted to oscillate about a driving axle geared with a wheel on said oscillating axle.

It is a further object of this invention to provide a chassis wherein a direct driven transmission and differential are secured on the chassis frame to transmit a reduced drive through a driving axle geared with a wheel removably supported on a stud shaft disposed parallel to the driving axle and adapted to oscillate about the driving axle housing.

It is another object of the invention to provide a vehicle chassis with an oscillating wheel supporting shaft, the supporting member of which is provided with a mechanism adapted to co-act with a device engaged on a link suspended chassis spring to afford a lever action between the spring and the oscillating axle supporting member when different loads are applied to the chassis frame.

It is an important object of this invention to provide a simple and effective means whereby the driving wheels of a vehicle are adapted to be removably supported on auxiliary axles which are supported by spring suspended brackets journalled on a driving axle housing to permit the auxiliary axles to oscillate about the driving axle.

Other and further important objects of this invention will be apparent from the disclosures in the specification and drawings.

The invention (in a preferred form) is illustrated in the drawings and hereinafter more fully described.

On the drawings:

Figure 1 is a fragmentary plan view of a telescoping vehicle chassis equipped with an oscillating wheel supporting axle mechanism embodying the principles of this invention.

Figure 2 is a fragmentary side elevation thereof.

Figure 3 is an enlarged view of a driving wheel taken on line 3—3 of Figure 1.

Figure 4 is a fragmentary section taken on line 4—4 of Figure 3 showing parts in elevation.

Figure 5 is an enlarged detail section taken on line 5—5 of Figure 2.

Figure 6 is a side elevation of a modified form of a spring suspension mechanism for the chassis.

As shown on the drawings:

The reference numeral 1 indicates a longitudinally adjustable telescoping chassis frame having a front axle 2 and front wheels 3 adjustable with the front section of the chassis frame. A telescoping drive shaft 4 has one end thereof connected with the vehicle motor and the other end directly connected with a gear transmission 5 and a differential 6. Transverse rods 7 and 8 are supported across the rear portion of the chassis frame by means of brackets or supports 9 through which the ends of said rods project. The transmission 5 and the differential 6 are rigidly secured to the chassis frame and to the transverse rod 7.

Secured to the projecting ends of the rods 7 and 8 on each side of the chassis frame are the lower ends of links 10 to the upper ends of which the ends of a leaf spring 11 are pivotally connected. Clamped or secured around the middle portion of the spring 11 is a clamp 12, the under side of which is provided with a rack 13.

The differential housing has integrally formed on the end thereof a rear axle sleeve or jack shaft housing 14 having apertured lugs 15 integrally formed thereon to permit the housing to be rigidly secured to the chassis frame or vehicle body. Disposed longitudinally within the axle housing 14 is a jack shaft or driving axle 16, the inner end of which is connected with the differential to receive a drive therefrom. The outer end of the main axle 16 projects out of the axle housing and has a ball bearing 17 and a sprocket gear or pinion 18 engaged thereon. Journalled on the axle housing 14 and on the ball bearing 17 are the sleeves 19 and 20 of a wheel supporting bracket 21. Integrally formed on the bracket 21 parallel to the sleeve 19 is a bearing sleeve 22 adapted to receive one end of an auxiliary or countershaft 23, which is parallel to the axle 16.

Mounted on the outer projecting end of the counter-shaft 23, is a roller bearing 24 and a ball bearing 25 for rotatably supporting a chassis rear driving wheel 26. An internal gear 27 is formed on the wheel 26 and is in mesh with the pinion 18 of the axle 16. The internal gear 27 is enclosed within an oil tight drum or casing 28, which is secured to the outer end of the bracket 21. Secured on the bracket sleeve 19 is a gear segment 29 which meshes with the rack 13 secured on the spring 11.

In the modified form of the device shown in Figure 6, the construction is substantially the same as that already described with the exception that the gear segment 29 is replaced by a cam member 30, which co-acts with a plate 31 forming a part of a clamp 32 engaged around the middle portion of the spring 11.

The operation is as follows:

With the telescoping frame arrangement shown in Figure 1 a straight line drive from the vehicle engine is transmitted through the telescoping shaft 4 directly to the transmission 5 and the differential 6. The transmission 5 and the differential 6 are rigidly secured to the chassis frame 1, as well as the jack shaft or rear axle housings 14. The brackets 21 are journalled on the housings 14 and support the auxiliary or countershafts 23 on which the driving wheels 26 are journalled with the internal gears 27 meshing with the pinions 18. The auxiliary or wheel shafts 23 are adapted to oscillate about the driving axle 16. A cushioning effect is obtained through the springs 11, the racks 13 of which mesh with the gear segments 29, which are secured on the brackets 21. The supporting links 10 for the springs permit said springs to shift or move with changes in the load so that at different loads the bearing points of the springs on the gear segments 29 change. The novel spring suspension permits easy riding qualities to be obtained with light loads as well as with heavy loads.

The distance of the auxiliary shafts 23 with respect to the frame 1 is variable since the supporting brackets 21 are adapted to swing or oscillate on the stationary jack shaft housings 14. The springs act as shock absorbers and prevent shocks from being transmitted to the vehicle driving mechanisms.

In the modified form of the device shown in Figure 6 the cam 30 co-acts with the shoe or plate 31 mounted on the spring. A rolling action or contact is obtained between the members 30 and 31, and the slippage is slight.

The driving wheels 26 are removably engaged on the shaft 23 and due to the gearing 18—27 between the axle 16 and said wheels a reduced speed is transmitted from the vehicle driving mechanism to the vehicle driving wheels.

We are aware that numerous details of construction may be varied through a wide range without departing from the principles of our invention, and we therefore do not purpose limiting the patent granted otherwise than necessitated by the prior art.

We claim as our invention:

1. The combination with a vehicle frame, of a driving axle, a housing therefor rigidly secured on said frame, a bracket journalled on said housing, a shaft supported thereby to oscillate about said housing, a wheel journalled on said shaft, gears connecting said wheel with said axle, a spring adjustably supported on said frame, a member clamped on said spring, and means on said bracket adapted to having roller contact with said member to afford a spring suspension for said frame.

2. The combination with a vehicle frame, of a driving axle, a housing therefor secured to said frame, a bracket journalled on said housing, a spring supported on said frame, movably interfitting members on said spring and bracket, a shaft supported by said bracket adapted to oscillate about said axle, and a wheel journalled on said shaft and connected to receive a drive from said axle.

3. The combination with a vehicle frame and a driving axle, of a housing for said axle rigidly secured to said frame, a wheel supporting member journalled on said housing, a spring adjustably supported on said frame, and co-acting means on said spring and on said supporting member having rolling contact with one another to afford a spring suspension for said frame.

4. The combination with a vehicle frame, of a driving axle, a housing for the axle secured on said frame, a wheel supporting bracket journalled on said housing, a spring, links adjustably supporting said spring on said frame, a rack member clamped on said spring, and gear means on said bracket adapted to co-act with said rack member.

5. The combination with a vehicle frame, of a driving axle, a housing for said axle secured to said frame, a bracket journalled on said housing, a wheel supported by said bracket to receive a drive from said axle, a spring, links pivotally connected with said spring and frame, and co-acting means on said spring and bracket having rolling contact with one another whereby the position of said spring with respect to said bracket is adapted to be changed depending upon the load applied to said frame.

6. The combination with a vehicle frame, of a driving axle, a housing for the axle secured on said frame, a wheel supporting bracket journalled on said housing, a spring, links adjustably supporting said spring on said frame, a member clamped on said spring, a rack forming a part of said member, and a gear segment secured on said bracket and in mesh with said rack.

7. The combination with a vehicle frame, of a driving axle, a housing therefor rigidly secured on said frame, a bracket journalled on said housing, a shaft supported thereby to oscillate about said housing, a wheel journalled on said shaft, gears connecting said wheel with said axle, a spring adjustably supported on said frame, a rack member clamped around said spring, and a gear segment on said bracket in mesh with said rack member to afford a spring suspension for said frame.

8. The combination with a vehicle frame, of a driving axle, a housing therefor secured to said frame, a bracket journalled on said housing, a spring supported on said frame, a rack secured on said spring, a gear segment on said bracket in mesh with said rack to afford a spring suspension for the frame, a shaft supported in said bracket adapted to oscillate about said axle, and a wheel journalled on said shaft and connected to receive a drive from said axle.

9. The combination with a vehicle frame, of a driving axle, a housing therefor secured to said frame, a bracket journalled on said housing, a spring supported on said frame, a rack member clamped on said spring, and a gear segment supported on said bracket and in mesh with said rack member to afford a spring suspension for the frame.

10. The combination with a vehicle frame and a rear wheel support, of a spring adjustably mounted on said frame, a rack member clamped around said spring, and a gear member on said support in mesh with said rack member to afford a spring suspension for said frame.

In testimony whereof, we have hereunto subscribed our names in the presence of two subscribing witnesses.

ALBERT EUGENE COOK.
THOMAS VAN TUYL.

Witness:
EARL M. HARDINE.